Oct. 21, 1969     C. J. LEFTAULT, JR     3,473,964
PROTECTIVE CLOSURE FOR DRY CELL BATTERY
Filed June 23, 1967
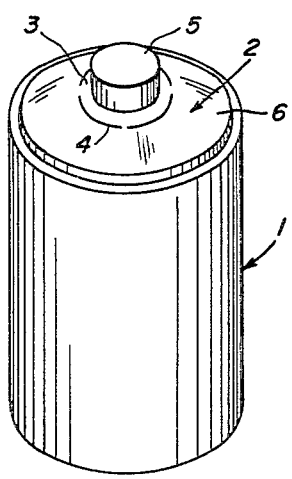
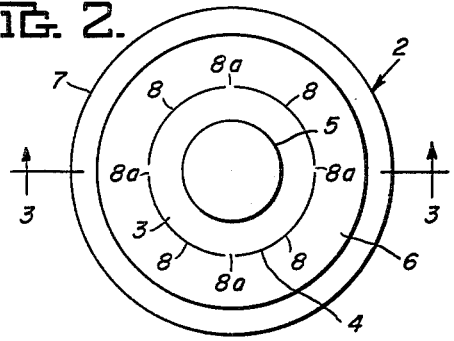
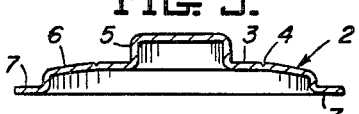
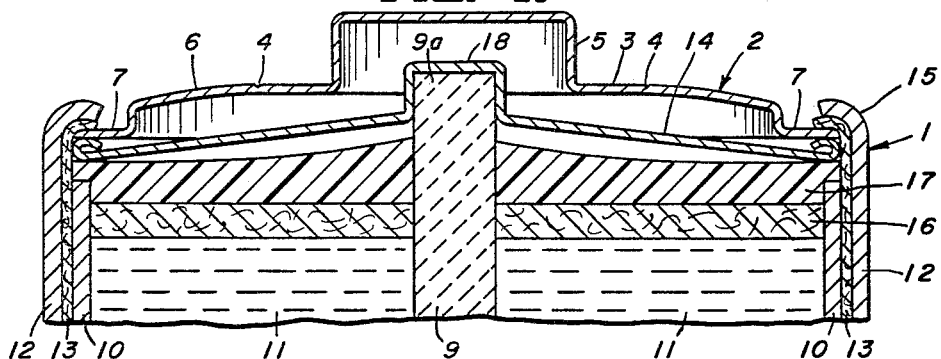
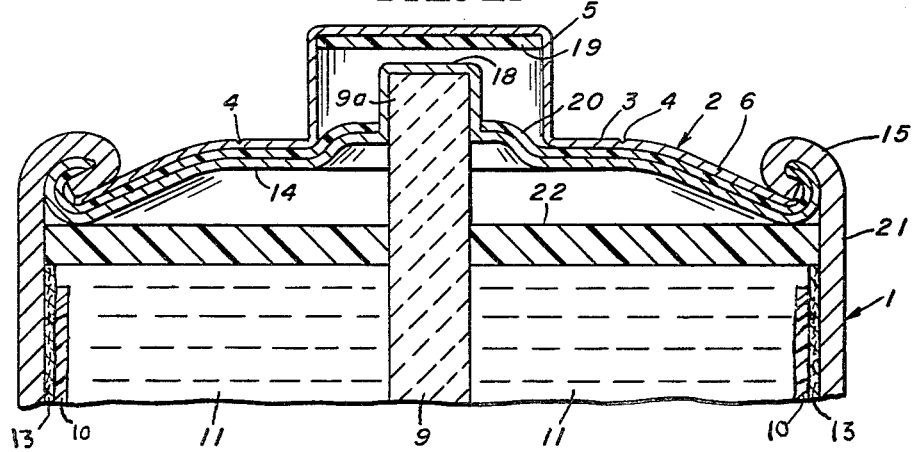
INVENTOR.
CHARLES J. LEFTAULT, JR.
By Arnold B. Silverman
Attorney

United States Patent Office 3,473,964
Patented Oct. 21, 1969

3,473,964
PROTECTIVE CLOSURE FOR DRY CELL BATTERY
Charles J. Leftault, Jr., Richmond, Ind., assignor to Aluminum Company of America, Pittsburgh, Pa., a corporation of Pennsylvania
Filed June 23, 1967, Ser. No. 648,439
Int. Cl. H01m 1/02
U.S. Cl. 136—169        7 Claims

ABSTRACT OF THE DISCLOSURE

A pilerproof closure for dry cell batteries having a removable sector adapted to overlie the battery terminal defined by a weakened line. A battery assembly having the closure secured over the terminal wall.

---

This invention relates to closures for batteries and more specifically it relates to pilferproof battery closures.

The conventional methods of shipping and marketing dry cell type batteries are such that no effective protection is provided to battery terminals. Not only is intentional use of the battery without leaving any visual indication of such use a problem, but also inadvertent shorting may occur during such periods. The consumer is, therefore, unable to purchase a battery with any degree of certainty as to its not having been in use previously. Also, when batteries are stored in a household, there is frequently uncertainty as to whether a battery has been previously used. This is particularly so where children have access to the storage area.

It is an object of this invention to provide a frangible closure for a dry cell battery which will effectively prevent undetectable access to the battery terminal.

It is another object of this invention to provide a pilferproof closure having a removable sector defined by a weakened line which sector may be readily removed to provide access to the battery terminal, but may not be replaced without leaving visible evidence of the closure having been opened.

It is another object of this invention to provide a battery assembly having a closure which completely prevents electrical contact with the battery terminal prior to severance of a removable sector of the closure.

These and other objects of this invention will be more fully understood and appreciated from the following description of the invention, on reference to the illustrations appended hereto, in which:

FIG. 1 is a perspective representation of a battery having a type of closure of this invention;

FIG. 2 is a plan view of a type of closure of this invention;

FIG. 3 is a vertical section of the closure shown in FIG. 2 taken along line 3—3;

FIG. 4 is an enlarged fragmentary vertical section of a battery assembly having a pilferproof closure; and FIG. 5 is a view similar to FIG. 4 showing another form of battery assembly contemplated by this invention.

Considering the drawings in greater detail, FIG. 1 shows a dry cell battery 1 having a pilferproof closure 2 secured over the top wall of the battery. The closure has a removable sector 3 defined by weakened line 4. Within removable sector 3 is an upwardly extending boss 5 which overlies the battery terminal. Access to the battery terminal may be had only by severance of weakened line 4 and removal of sector 3.

Turning now to the embodiment of the invention illustrated in FIGS. 2 and 3, it will be seen that the weakened line 4 divides the closure 2 into two sectors. The closure has an inwardly disposed removable sector 3 and an outwardly disposed annular peripheral sector 6. The removable sector 3 is circular, concentric with respect to said outwardly disposed annular peripheral sector 6 and has a substantially horizontal annular portion disposed intermediate the weakened line 4 and the boss 5. At the outermost portion of peripheral sector 6 is an annular flange 7. The portion of the closure 2 intermediate flange 7 and weakened line 4 extends generally upwardly and inwardly. This configuration conveniently complements the inward and upward slope of the top wall of the battery.

The weakened line 4 shown in FIG. 2 consists of alternate lanced or fractured sectors 8 and bridged sections 8a. The bridge sections 8a are either unweakened or weakened to a lesser extent than lanced sectors 8. While there is no critical minimum number of bridges 8a, there should be a sufficient number to prevent the lanced sections 8 from providing an opening sufficiently large to permit access to the battery terminal 9a by means of a wire or other conductive device. If desired, the bridge portions may be weakened, as by scoring.

Alternatively, the weakened line may be a scored line which may be continuous or discontinuous and of varying depths if desired. It is necessary, however, to effect an optimum level of panel integrity. The weakened line 4 must be sufficiently strong to withstand the normal abuse encountered in shipping, storing and handling the battery prior to purchase by the consumer. It is also necessary that the consumer be able to sever the weakened line without substantial difficulty when he desires to gain access to the terminal.

The enlarged section of FIG. 4 illustrates a form of battery assembly contemplated by this invention. The dry cell battery selected for illustration has a centrally disposed carbon electrode 9 and generally cylindrical zinc electrode 10. A terminal 9a is located at the uppermost portion of electrode 9. An electrolyte 11 is disposed intermediate the electrodes. The lateral or side wall 12 of the battery is made of metal such as steel and is separated from the zinc electrode 10 by an insulating material 13 such as paper, for example. Closure 2 is secured intermediate top wall 14 and the lateral wall 12, with the lateral wall 12 being folded inwardly onto the periphery of top wall 14. An insulating material 17 is disposed above an annular cardboard member 16. Insulating material 17 prevents electrical contact between zinc electrode 10 and top wall 14.

Any reference to the "exposed portion" of the battery top wall shall refer to the portion of the top wall visible prior to closure attachment. In FIG. 4, the closure 2 is shown as being substantially coextensive with the exposed portion of top wall 14 and is secured to the battery by means of annular flange 7 which is retained in seam 15. The boss 5 has an upwardly extending generally cylindrical peripheral wall terminating in a substantially horizontally disposed transverse wall and is shown in overlying relationship with respect to the terminal 9a. As illustrated, the closure boss 5 is in spaced overlying relationship with respect to the terminal 9a as well as the portion 18 of the top wall 14 which overlies the terminal 9a. (For clarity of explanation the word "terminal" has been used to refer to the upper portion of electrode 9 and the overlying top wall portion has been given reference numeral 18. It is to be understood, however, that as portion 18 is made from a conductive material, the word "terminal" in a general sense will be employed to refer to either terminal 9a or portion 18 as they are functionally equivalent.) Alternatively, the boss 5 could be placed in an overlying positon which permits contact with the electrode, provided the boss is either composed of a non-conductive material or an insulating interface is provided intermediate the boss 5 and the terminal 9a. It is thus appreciated that if the closure boss is composed of an electrically conductive material, it is essential to prevent the creation of an electrical path between the battery terminal 9a and the closure boss. This may be effected by employing a boss of non-conductive material or using a spaced overlying relationship thereby employing the air as an insulator or by providing an intermediate insulating material or any other convenient means.

The use of an insulating material 19 is illustrated in FIG. 5, which also shows a different form of battery seam. This may conveniently be a web of insulating material such as paper or plastic or an insulating coating, such as an organic coating, for example. As the overlying top wall portion 18 must be a conductive material in order less for the battery to function properly during use, it is generally preferable to rely upon the insulating methods recited above rather than coat or cover the overlying top wall portion 18. Should it be desired, however, it is entirely acceptable to cover portion 18 as by a removable insulating material, such as a tape, in order to effect insulation from the boss 5.

In the forms of battery and closure shown for purposes of illustration, both the top wall 14 and the closure are made of metallic, electrically conductive material. In such an arrangement in order to insulate the terminal 9a from the closure, it is desirable to provide additional insulation. This may be obtained in any convenient fashion as by coating at least one of the top wall 14 and closure 2 with an insulating material, or by providing a separate insulating web. If both closure 2 and top wall 14 are conductive, an insulating material should be provided intermediate flange 7 and the radially outermost portion of top wall 14. In the form shown in FIG. 5, the battery top wall 14 has an insulating coating 20 applied over a substantial portion of its outer surface. Also, insulating material 13 separates conductive lateral wall 12 from top wall 14 and closure 2. Should either the closure 2 or top wall 14 excluding the overlying top wall portion 18 be made of non-conductive material, this supplemental insulation would not be required.

In effecting opening of the battery, weakened line 4 is fractured thereby permitting withdrawal of removable sector 3 and access to the battery terminal. Severance of the weakened line may be accomplished by striking the closure within the removable sector 3, by tapping the closure boss 5 against a solid object, by the use of a suitable implement or by any other convenient means. Once the weakened line has been severed to a sufficient extent to permit access to the terminal 9a the closure 2 cannot be restored to its initial appearance as it provides a clear visual indication of prior tampering and the consumer is thereby alerted to the tampering.

The closure which in the preferred form covers the entire top wall 14 may be secured to the battery in any convenient fashion. It may, for example, be secured adhesively, as only the removable sector need be freed in preparing the battery for use. It may also conveniently be permanently circumferentially continuously secured to the seam 15 joining the top wall 14 and lateral wall 12. If a closure 2 covering less than the full top wall is employed, use may be made of the seam 15, but adhesive securance becomes more advantageous.

With respect to closures covering the entire exposed top wall, they may be secured during battery manufacture by seaming or by merely folding the seam over the closure flange 7 for crimped or frictional retention. Alternatively, the closure may be secured to the battery after completion of battery manufacture.

It will be appreciated that this closure is designed for economical manufacture and may be made from a single web of material. As provision is made for prevention of electrical contact with the battery terminal after closure affixation, the material may conveniently be a deformable, conductive material such as aluminum, for example.

It will further be appreciated that this closure assembly effectively prevents undetectable access to the battery terminal, as well as inadvertent shorting of the terminal. Once the consumer has by a quick visual inspection determined that the battery has not been tampered with, he may readily sever removable sector 3 and gain access to the battery terminal.

While for purposes of illustration, certain dry cell type battery configuration has been shown, it will be appreciated that the closure and method of this invention are intended for use with numerous dry cell type batteries.

Whereas particular embodiments of the invention have been described above for purposes of illustration, it will be evident to those skilled in the art that numerous variations of the details may be made without departing from the invention as defined in the appended claims.

I claim:

1. A closure for protectively encompassing a dry cell battery terminal comprising:
   a substantially rigid circular panel having a radially inwardly disposed removable sector and a radially outwardly disposed continuous annular peripheral sector;
   at least one weakened line defining and separating said sectors;
   said peripheral sector extending generally upwardly from its outermost portion toward its innermost portion;
   an upwardly extending hollow boss disposed within said removable sector;
   said removable sector having an annular portion disposed intermediate said weakened line and said hollow boss;
   at least a portion of said boss being disposed in the center of said panel;
   said boss having an upwardly extending generally cylindrical peripheral wall terminating in a substantially horizontally disposed transverse wall; and
   the diameter of said transverse wall being greater than the diameter of the battery terminal which it is adapted to overlie.

2. The closure of claim 1 wherein said closure is made of an electrically conductive deformable material and a substantial portion of the underside of said closure is coated with an insulating material.

3. The closure of claim 1 wherein
   said peripheral wall of said boss is of greater height than said terminal,
   said removable sector is circular and concentric with respect to said continuous annular peripheral sector,
   said boss is centrally disposed within said panel, and
   said weakened line is comprised of alternate lanced and bridged portions.

4. A dry cell battery assembly comprising:
   a dry cell battery having a bottom wall, a side wall and a top wall;
   a continuous inwardly directed seam securing said side wall to said top wall;
   said top wall having a substantially centrally disposed terminal;
   a closure substantially coextensive with the exposed portion of said top wall disposed in protective overlying relationship with respect to said top wall and permanently circumferentially continuously secured within said seam;
   said closure having a removable sector defined by at least one weakened line;
   an upwardly disposed hollow boss within said removable sector disposed in spaced overlying relationship with respect to said terminal;
   said removable sector having an annular portion disposed intermediate said weakened line and said hollow boss;

whereby severance of said weakened line permits removal of said removable sector and access to said battery terminal.

5. The battery assembly of claim 4 wherein said removable sector is disposed in spaced overlying relationship with respect to said top wall, said boss having an upwardly extending generally cylindrical peripheral wall terminating in a substantially horizontally disposed transverse wall, and said annular portion of said removable sector is substantially horizontally disposed.

6. The battery assembly of claim 4 wherein said closure is made of aluminum and at least one of said closure and said top wall is coated with an insulating organic coating over a portion thereof.

7. The battery assembly of claim 4 wherein an insulating material is disposed intermediate said top wall and said closure to prevent electrically conductive paths between said terminal and said closure exterior.

References Cited

UNITED STATES PATENTS

| | | | |
|---|---|---|---|
| 1,168,078 | 1/1916 | Jefferson | 136—181.1 |
| 1,539,427 | 5/1925 | Rector | 136—132 |
| 1,671,566 | 5/1928 | Baldwin | 136—132 |
| 3,358,873 | 12/1967 | Gelber | 220—54 |

FOREIGN PATENTS

| | | |
|---|---|---|
| 542,270 | 5/1922 | France. |
| 967,418 | 8/1964 | Great Britain. |

WINSTON A. DOUGLAS, Primary Examiner

D. L. WALTON, Assistant Examiner

U.S. Cl. X.R.

136—133, 181; 220—54

UNITED STATES PATENT OFFICE
CERTIFICATE OF CORRECTION

Patent No. 3,473,964　　　　　　　　　　　　October 21, 1969

Charles J. Leftault, Jr.

It is certified that error appears in the above identified patent and that said Letters Patent are hereby corrected as shown below:

Column 3, line 17, cancel "less".

Signed and sealed this 27th day of January 1970.

(SEAL)
Attest:

Edward M. Fletcher, Jr.　　　　　　　　WILLIAM E. SCHUYLER, JR.
Attesting Officer　　　　　　　　　　　　Commissioner of Patents